May 19, 1970    C. CHEDISTER    3,512,270
VEHICLE OPERATOR TRAINING SYSTEM AND METHODS
Original Filed May 31, 1961                    7 Sheets-Sheet 7

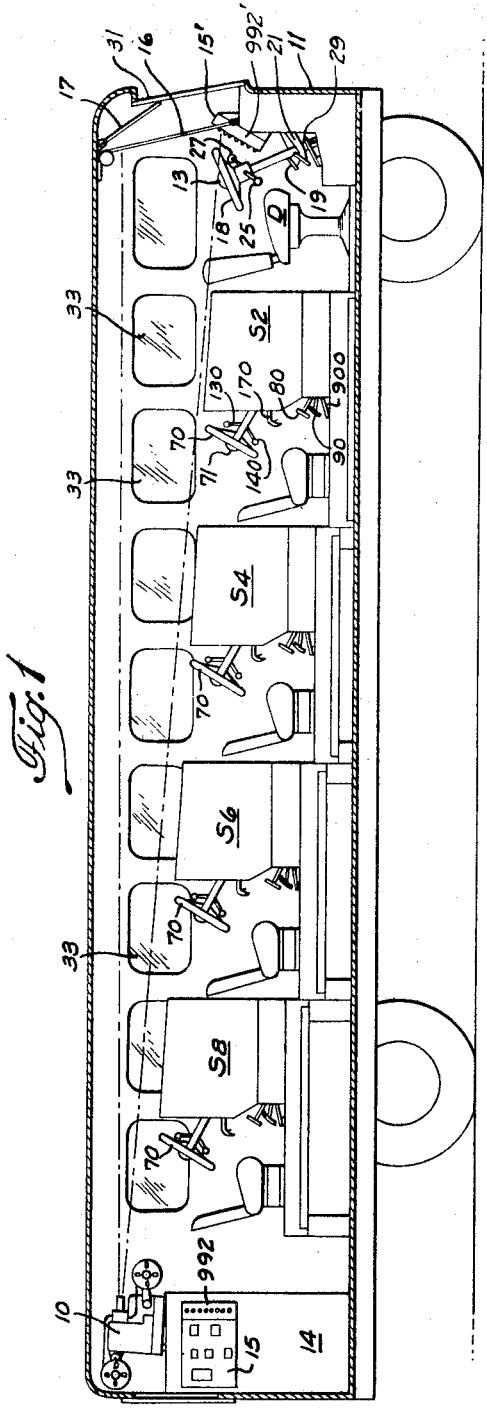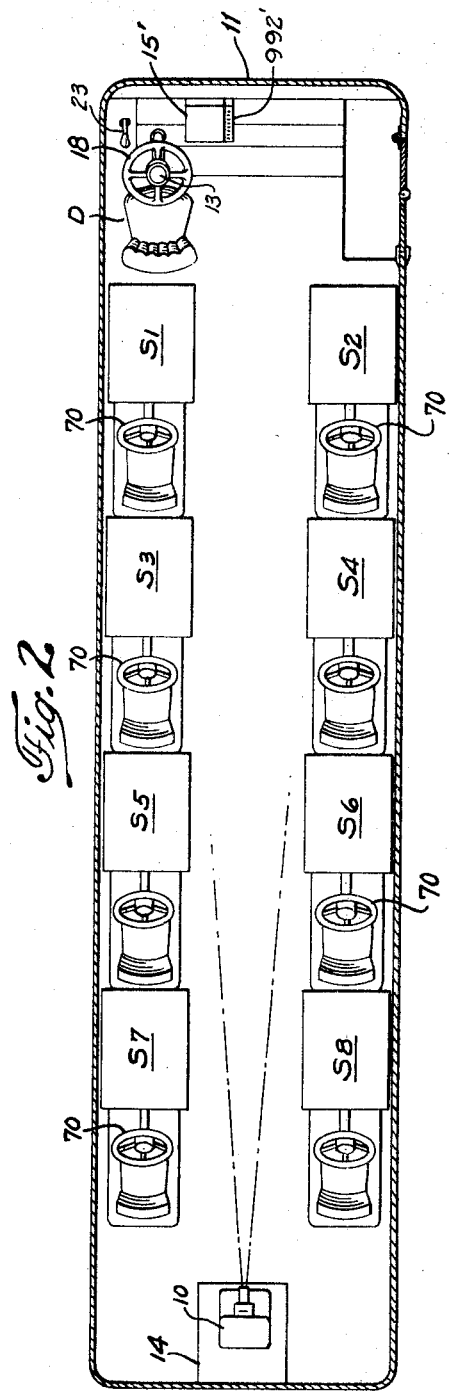

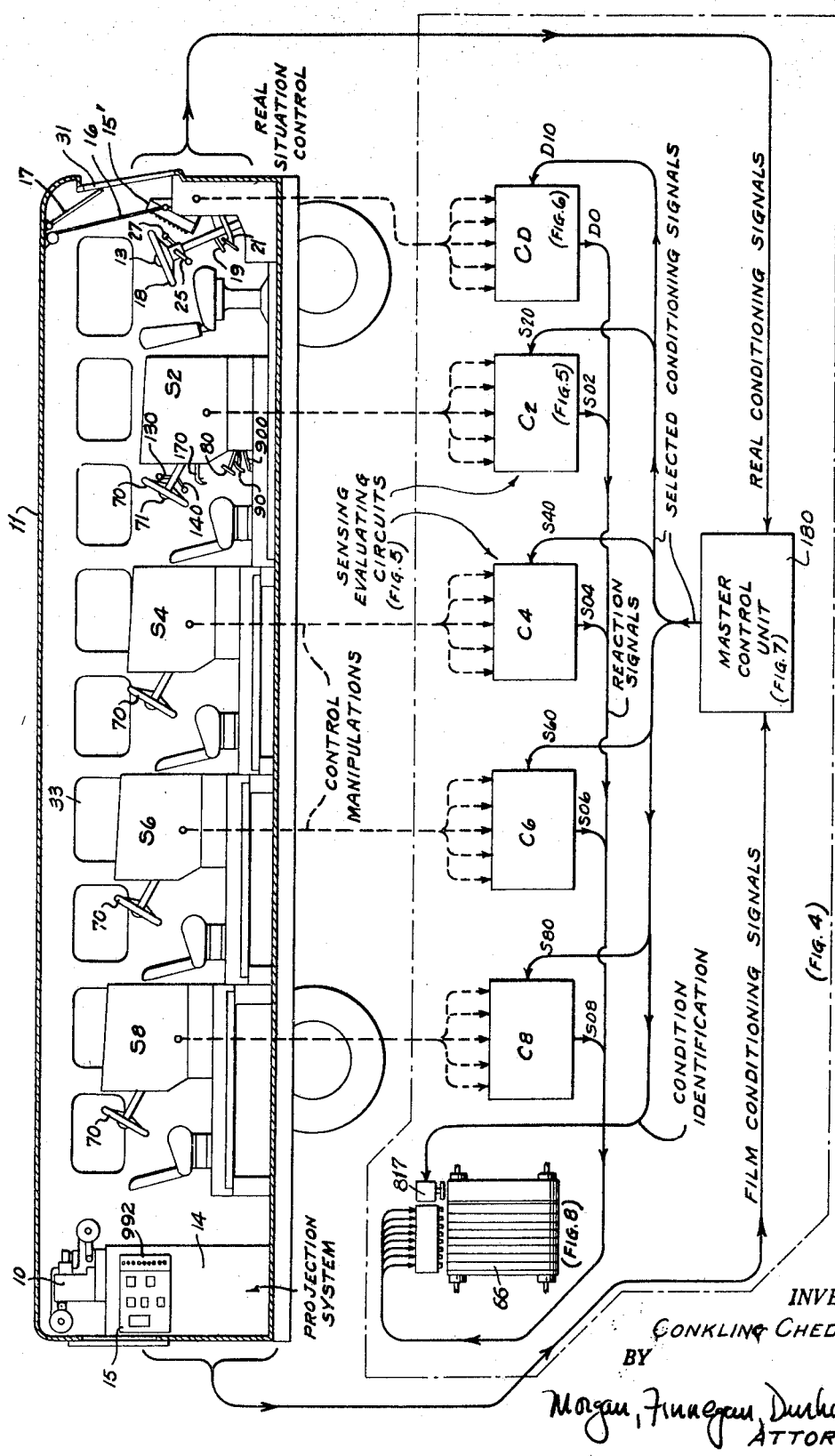

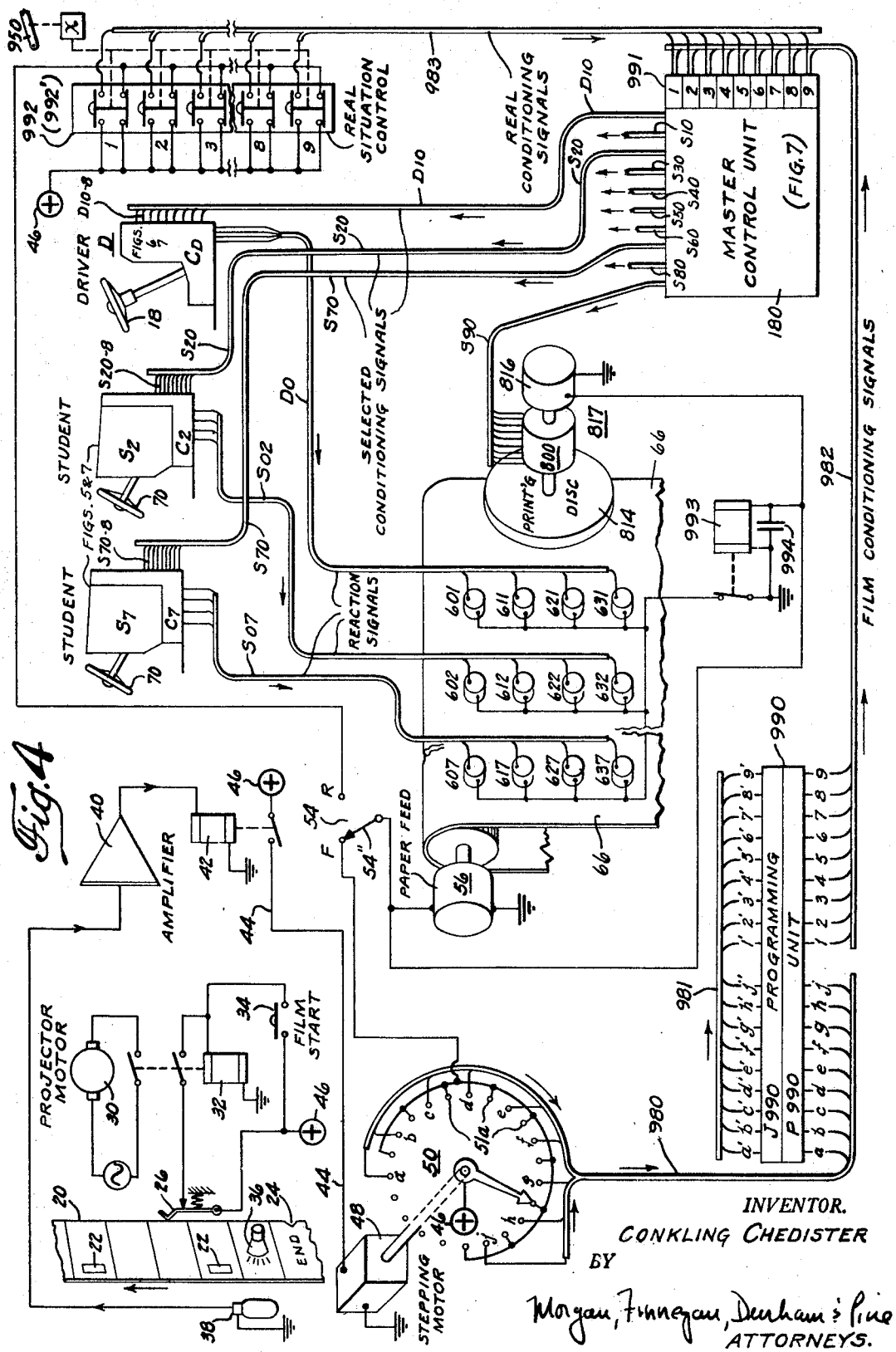

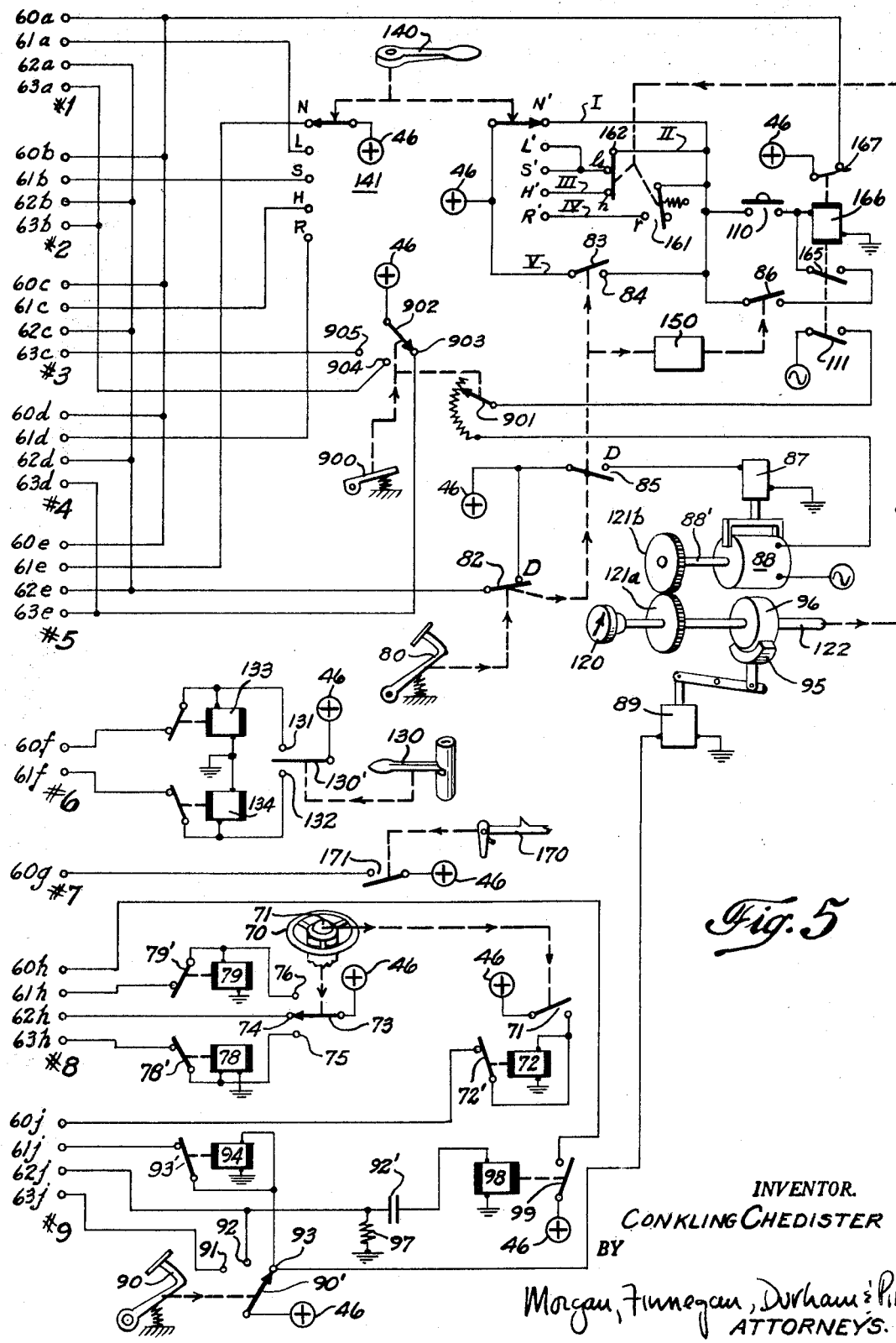

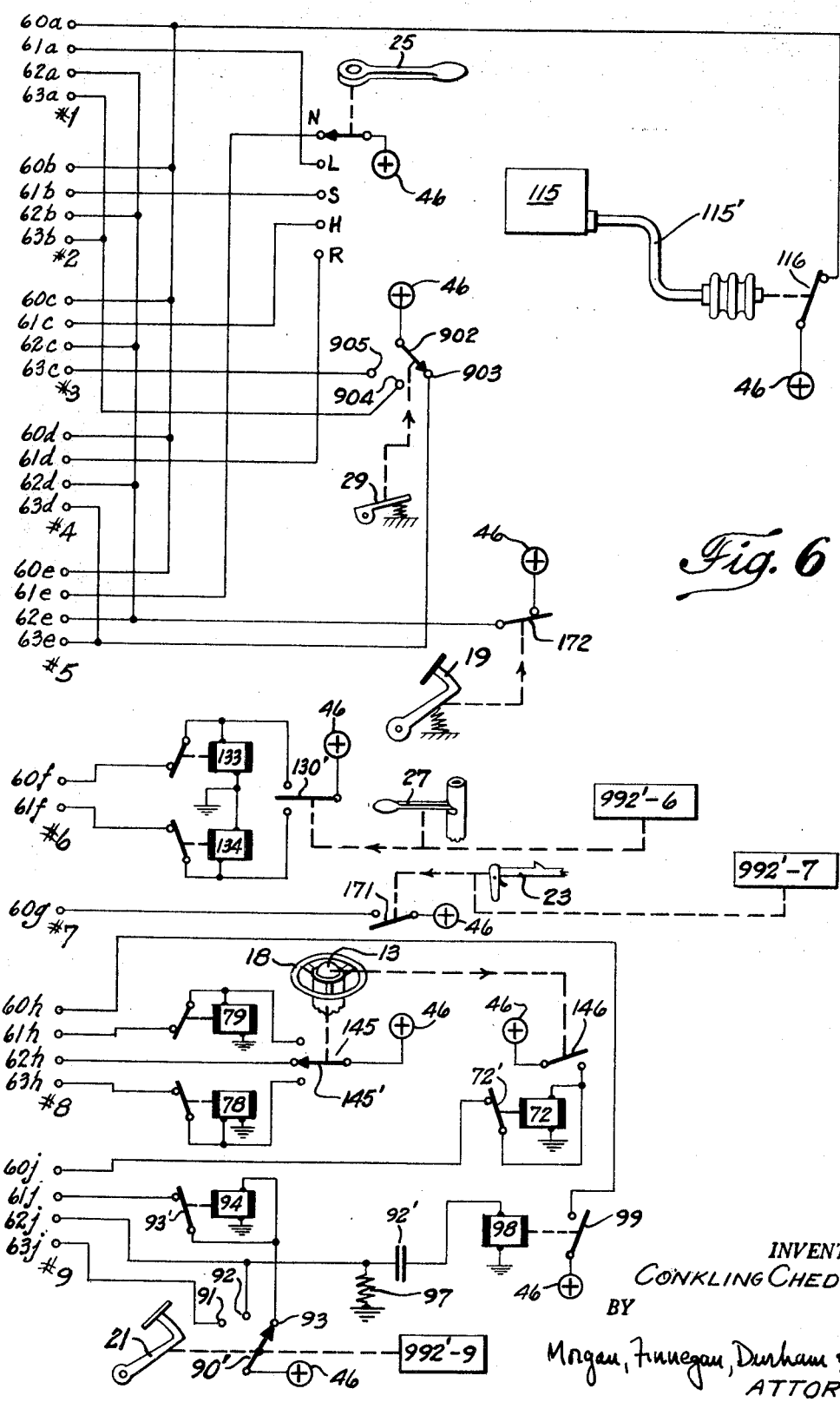

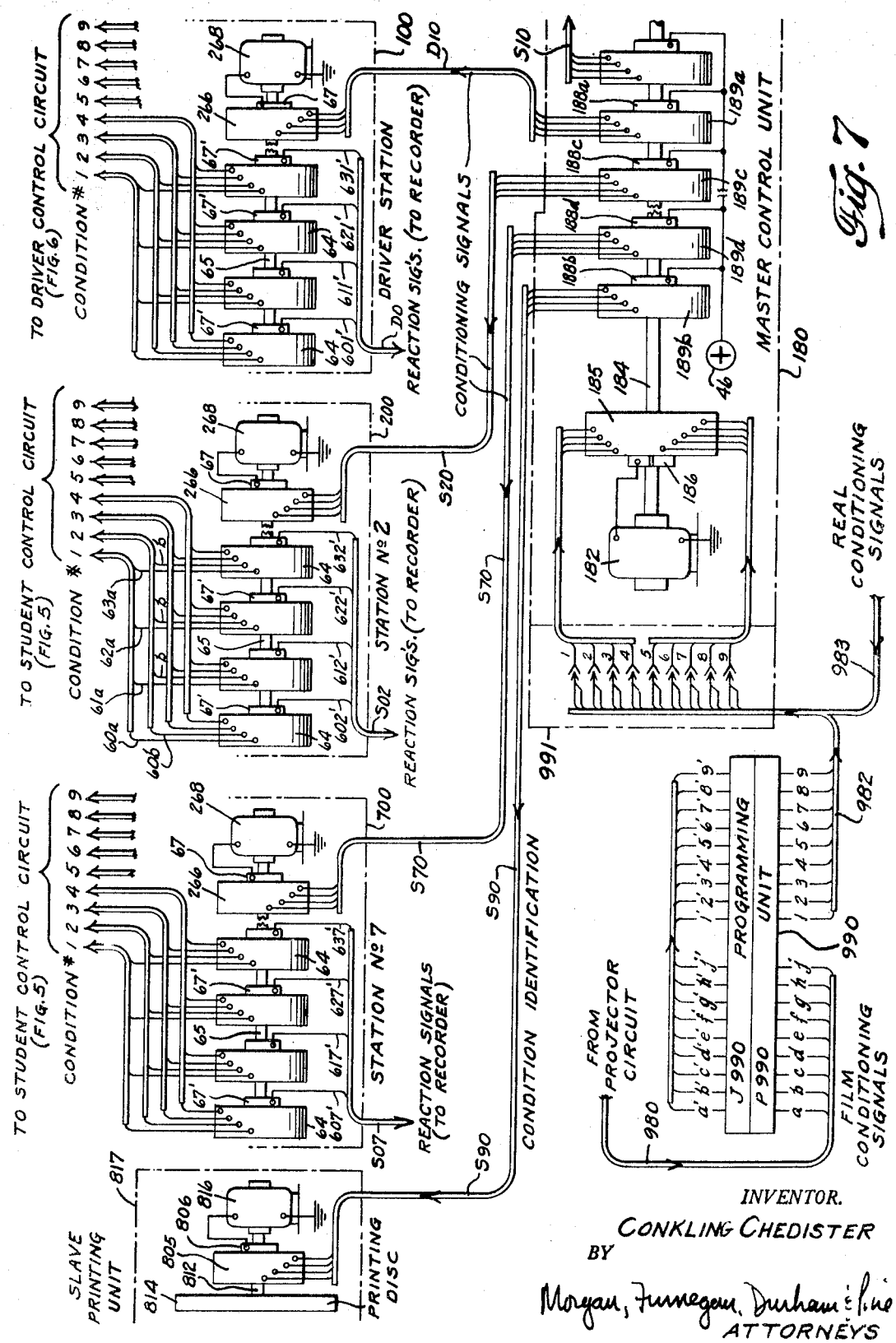

| | | 1 | 2 | 3 | 4 | 5 | 6 | | 19 | 20 | 21 | 22 | 23 | 24 | 25 |
|---|---|---|---|---|---|---|---|---|---|---|---|---|---|---|---|
| TEST 9 | DID APPLY HAND BRAKE | | | | | | | | | | | | | | |
| TEST 8 | DID NOT STALL | | | | | | | | | | | | | | |
| | DID SHIFT TO NEUTRAL | | | | | | | | | | | | | | |
| | DID RELEASE CLUTCH | | | | | | | | | | | | | | |
| | DID REDUCE MOTOR SPEED | | | | | | | | | | | | | | |
| TEST 7 | DID BRAKE FOR SKID | | | | | | | | | | | | | | |
| | DID TURN LEFT | | | | | | | | | | | | | | |
| | DID STEER STRAIGHT | | | | | | | | | | | | | | |
| | DID TURN RIGHT | | | | | | | | | | | | | | |
| TEST 6 | DID LEFT SIGNAL | | | | | | | | | | | | | | |
| | DID RIGHT SIGNAL | | | | | | | | | | | | | | |
| TEST 5 | DID BLOW HORN | | | | | | | | | | | | | | |
| | DID BRAKE HARD | | | | | | | | | | | | | | |
| | DID BRAKE MEDIUM | | | | | | | | | | | | | | |
| | DID BRAKE SOFT | | | | | | | | | | | | | | |
| TEST 4 | DID BRAKE FOR SKID | | | | | | | | | | | | | | |
| | DID TURN LEFT | | | | | | | | | | | | | | |
| | DID STEER STRAIGHT | | | | | | | | | | | | | | |
| | DID TURN RIGHT | | | | | | | | | | | | | | |
| TEST 3 | DID SYNCHRONIZE MOTOR | | | | | | | | | | | | | | |
| | DID RELEASE CLUTCH | | | | | | | | | | | | | | |
| | DID SHIFT TO HIGH | | | | | | | | | | | | | | |
| | DID NOT STALL | | | | | | | | | | | | | | |
| TEST 2 | DID SYNCHRONIZE MOTOR | | | | | | | | | | | | | | |
| | DID RELEASE CLUTCH | | | | | | | | | | | | | | |
| | DID SHIFT TO SECOND | | | | | | | | | | | | | | |
| | DID NOT STALL | | | | | | | | | | | | | | |
| TEST 1 | DID SYNCHRONIZE MOTOR | O | O | | O | O | O | | | O | O | O | | O | O |
| | DID RELEASE CLUTCH | O | O | O | O | O | O | | O | O | O | O | | O | O |
| | DID SHIFT TO LOW | O | O | O | O | O | O | | O | O | O | O | | O | O |
| | DID STALL | | | O | O | O | | | | O | O | O | | | |
| | DRIVER | 1 | 2 | 3 | 4 | 5 | 6 | | 19 | 20 | 21 | 22 | 23 | 24 | 25 |

STUDENTS

Fig. 8

INVENTOR.
CONKLING CHEDISTER
BY
Morgan, Finnegan, Durham & Pine
ATTORNEYS.

United States Patent Office 3,512,270
Patented May 19, 1970

3,512,270
VEHICLE OPERATOR TRAINING SYSTEM AND METHODS
Conkling Chedister, Madison, N.J., assignor, by mesne assignments, to The Aetna Casualty & Surety Company
Continuation of application Ser. No. 113,735, May 31, 1961. This application Mar. 25, 1965, Ser. No. 442,692
The portion of the term of the patent subsequent to May 19, 1984, has been disclaimed
Int. Cl. G09b 9/04
U.S. Cl. 35—11                                    14 Claims

ABSTRACT OF THE DISCLOSURE

A method and apparatus for training students in vehicular operation wherein a plurality of simulated vehicular controls are provided in a vehicle, each mounted so as to provide a view of the exterior of the vehicle. The vehicle is operated by a driver who responds to prospective traffic situations by conditioning certain sensing devices at each of the simulated control stations and the driver's station. The subsequent control operations of the student and the driver are sensed by the sensing means, converted to electrical signals and passed to a recorder to form a permanent record of the responses of the student and the driver. Arrangement is also made to present visual images of traffic situations on a screen in the front of the vehicle by film having indicia thereon conditioning the sensing means which then provide records in the same way as above.

---

This invention relates to techniques for training students to operate vehicles and, more particularly, to a training system which effectively combines real and simulated vehicular equipment, and real and simulated environmental factors in integral association with computing equipment for controlling, measuring and processing data flow in the system. This data flow is related to and indicative of the nature and characteristics of the real or simulated environmental factors as well as the responses of the trainees which result from exposure to said factors. According to the methods and system of the invention, the exposure of a plurality of students to both real and simulated operating conditions is provided together with the measurement, and recording or indicating, of the students' resultant performance.

This application is a continuation of applicant's prior co-pending application Ser. No. 113,735, filed May 31, 1961, now abandoned, and bearing the same title.

In the training of vehicle operators, for example, automobile drivers, there is, as an ultimate objective, the production of competent drivers, drivers who are skillful in handling the vehicle, who operate the vehicle safely and within legal limits and who exercise consideration and courtesy in their relation to other drivers and to pedestrians.

Contrary to the thinking of many people, the mere exposure of a person to an automobile does not make him a competent driver and even to those who recognize this fact, there is quite frequently a lack of appreciation for the high skills and complex attitudes which make up the competent driver. The history of automotive transportation provides ample proof of these facts.

Automobile accidents have reached the point where world-wide slaughter occurs in shameful proportions. It has been recognized that proper training of potential drivers could at least partially mitigate this condition and there is currently a widespread acceptance of this fact. Insurance companies, for example, offer reduced premiums where the applicant has had formal driver training.

In its earliest form, training was confined to what might be called the apprentice method. In this method, which is still practiced, no training equipment or formal instruction is employed. A driver-instructor, an automobile, and a willing student are the only essential ingredients. Institutions practicing this method have come to be known as "Driving Schools" but this is actually a misnomer since there is usually lacking the formal approach to training which characterizes a true school.

Subsequent to the employment of the apprentice method, a new approach developed which generally involved formal group instruction. At present, this instruction is generally under the supervision of public institutions such as schools although private institutions also exist. The rationale of this latter approach is founded on the proposition that the teaching of automobile drivers should be pursued in the same rigorous manner as is employed in the teaching of other skills. To this end training aids and training equipment of various kinds have been developed. These include dual-control automobiles and various classroom aids such as training films, synthetic automobiles or simulators, and even recording and evaluating techniques designed to objectively evaluate the performance of the student.

As an illustration of a training aid system which has adopted some or all of these components, reference may be had to copending application, Ser. No. 683,814, filed Sept. 13, 1957 for driver training apparatus, now matured into Pat. No. 3,015,619. The system disclosed therein, of which the applicant is co-inventor, employs synthetic driving units or automobile simulators together with a film presentation arrangement, and sensing and recording equipment. In operation, a group of students seated in the automobile simulators observes a sequence of filmed traffic situations projected on a screen. In response to the specific conditions they observe, the students manipulate simulated controls in the automobile simulators and their performance in this respect is sensed and evaluated by electrical circuits associated with the controls. A recording system coupled to each of the simulated automobiles receives signals from these electrical circuits. These signals are indicative of the character of the control manipulations of the students. The recording system records these signals graphically so that a permanent record may be obtained. This technique enables the teacher to evaluate the performance of each student, a feat which would otherwise be a practical impossibility.

The formal group instruction capable of being implemented by the above described arrangement has a number of advantages over the so-called apprentice method. Because of the relatively high student-instructor ratio and because of the relatively low per capita equipment cost, formal group instruction provides, for the same amount of training, significant economic advantages over the apprentice method. It is also less dangerous than the apprentice method in that the basic and prerequisite skills may be developed without subjecting the student and instructor to the hazards of actual operating conditions. The formal techniques, by virtue of the supervision and regulation associated therewith, is also productive of more thorough training and is less susceptible to the ill effects of incompetent instructors and incomplete training programs.

While the formal approach to driver training is economically effective, it presents as presently practiced a problem generally non-existant in the apprentice method. This problem relates to what is known as training transfer, that is, the problem of making the transition from the artificial conditions associated with the classroom to the real conditions found in operating an actual car under actual conditions. To the extent that the formal training is accomplished in an environment which closely simulates the real environment, there is said to be a maximum training transfer in which case the skills, appreciations and understandings acquired in the classroom are almost immediately applied by the student in the actual situation. If, however, the training is accomplished with instructional and simulating techniques which do not closely resemble actual conditions, then there is a lesser training transfer and the student will encounter difficulties which can be very substantial in making the transition to the real situation.

As an example, one may consider the effect of traffic noise. If, in the course of his formal training the student has not been subjected to actual or simulated traffic noise conditions, then it is possible that he may become confused and involved in an accident in the presence of real traffic noise.

It is evident then that the most efficient training subjects the student to environmental conditions which simulate as closely as possible the real conditions he will encounter as an automobile driver. This objective is gradually being attained as the fidelity of simulation improves. The techniques disclosed in the aforesaid copending application represent an advance in this direction. However, the problem is still an acute and perplexing one and its presence limits the effectiveness of formal group instruction.

The present invention is designed to provide a major advance in the training of vehicle operators in that it substantially reduces the training transfer problem. According to the invention the student, in addition to being subjected to simulated presentations, is exposed to real driving conditions and given an opportunity to practice control manipulations as dictated by these conditions. Accordingly, a group of students is able to actually observe on-the-scene traffic conditions, can view for example the manifold activities which occur at a traffic intersection and the students can observe the movements of their own vehicle and other vehicles in this situation. Besides being able to manipulate vehicle controls in accordance with observed conditions, the students may be subjected to a monitoring arrangement which involves a sensing and evaluation of their control movements and a recording of the results so that they and their instructor may be appraised of their performances. All of these features are realized with a single unitary technique in which the benefits of both apprentice and formal group instruction are combined while the disadvantages of both are eliminated.

It is accordingly an object of the invention to provide a method and system in which a plurality of students are supplied with simulated vehicle controls and are concurrently exposed to real and variable operating conditions whereby the students can practice control manipulation in accordance with the conditions they observe.

It is another object of the invention to provide a training method and system as set forth above in which the inherent dangers of on-the-road instruction are eliminated by isolating actual control of the bus from the students.

It is another object of the invention to provide both a training method wherein students are subjected to real and variable operating conditions and their control responses are objectively tested, as well as a system for practicing the same.

It is also an object of the invention to provide a training system capable of objectively testing and recording the performance of students under actual operating conditions.

It is a further object of the invention to provide objective testing and evaluation of both the manipulations of simulated controls by students seated in a mobile vehicle and the manipulations of the real controls of the vehicle by the operator thereof.

A further object of the invention is to provide a standard for evaluating student performance, said standard being related to the vehicle operator's performance.

It is a further object of the invention to provide a training system in which both real and simulated conditions can be presented to a plurality of students and in which the performance of the students under both kinds of conditions may be objectively evaluated and recorded.

It is an additional object of the invention to provide a training system capable of subjecting students to both real and simulated operating conditions and in which specific controls or combinations of controls at each of the students' stations are singled out for recording purposes in accordance with the nature of the impending operating condition, either by instructor selection, driver selection, automatically by the simulated presentation or by the driver's control responses.

It is a further object of the invention to provide a multiple station mobile vehicle capable of exposing a plurality of students to actual or simulated operating conditions in which means are included for illustrating proper responses to said conditions.

These and other objects and advantages of the invention will be set forth in part hereinafter and in part will be obvious herefrom, or may be learned by practice with the invention, the same being realized and attained by means of the instrumentalities and combinations pointed out in the appended claims.

Briefly and generally, the invention comprises a mobile classroom which includes an actual driver station and a plurality of simulated driving stations. The stations are arranged in a vehicle so as to present to the occupants thereof a view of the path of the vehicle and the traffic conditions it encounters. Alternatively or conjunctively, means are included which provide a view of a screen on which a filmed (simulated) sequence of traffic events may be presented from a film projection system. In the mode of operation where real conditions are observable, the vehicle under the control of the driver, traverses courses which include actual traffic intersections, highways, side streets, traffic circles, hills, parking situations and the like, the incidents of which are observable by the students. Each of the simulated (student's) stations is provided with a set of simulated controls, e.g., a steering wheel, brake, an accelerator, and a gear shift, these controls being adapted to be operated by the students. The students may accordingly manipulate these controls in response to the observed conditions. In the mode of operation where the students are presented with a filmed sequence of conditions, the controls may be likewise manipulated. Thus, whether the condition is real or simulated, the students may practice direction control, speed control and signaling procedures in accordance with what they observe. Means are also provided in the mobile classroom for enabling the students to observe the actual driver's manipulation of the real vehicle controls.

For evaluating and recording the performance of the students and/or the driver, there is provided a data sensing and processing system which includes sensing circuits associated with and responsive to the controls at each station in the vehicle. These circuits serve to convert control operations into related electrical data. The data are processed to supply signals for evaluation. The processed signals, being indicative of the way in which the controls have been manipulated, actuate recording mechanisms in the recorder.

To avoid complexity, all of the controls at each station are not simultaneously coupled to the recorder, rather, specific of the controls at each station are selected or conditioned for sensing and recording at a given time by means of a conditioning or switching system which is controlled either from the film projection system or by the driver or instructor. Corresponding to every traffic event is a certain vehicle control regime. The regime involves operation of certain of the controls as well as the coordination of these control operations, i.e. their use in proper sequence and at proper rates. Thus, the conditioning system, under control of the driver, instructor, or film projection system, connects selected portions of the sensing circuit at each station to the recorder, as determined by the control combination characterizing the impending traffic event. Components of the above described system are also illustrated and described in the aforesaid copending application.

In the method according to the invention a plurality of students are simultaneously exposed to actual operating conditions, their control responses thereto are objectively tested and the results indicated for evaluation.

The invention consists in the novel parts, constructions, arrangements, combinations, methods, steps and improvements herein shown and described.

Illustrating an implementation of the invention with an exemplary system of components and interconnections are the drawings of which:

FIG. 1 is an elevation side view, partly in cross section, illustrating a vehicle which serves as the mobile classroom;

FIG. 2 is a plan view partly in section of the arrangement of FIG. 1;

FIG. 3 is a schematic view illustrating the overall system arrangement including the physical layout of the mobile vehicle, and the association therewith of the data measuring, processing and control equipment for sensing, evaluating and recording the student's and driver's performances;

FIG. 4 is a schematic drawing illustrating some of the details of the system shown in FIG. 3;

FIG. 5 is a schematic drawing of the controls and their associated sensing and evaluating circuits in a typical student's (simulated) station;

FIG. 6 is a schematic drawing of the controls and associated sensing and evaluating circuits at the driver's station;

FIG. 7 is a schematic drawing of the inter-connection devices employed to select or condition certain sensing circuits at each station and to couple reaction signals resulting from manipulation of these controls to a recorder; and FIG. 8 is a typical chart which my serve as a record of the performance of the students and the driver.

INSTRUMENTATION AND BASIC GEOMETRY

Considering now the physical details of the mobile classroom, reference may be had to FIGS. 1 and 2 wherein a bus-type vehicle is illustrated. Within the housing of the vehicle 11 are a group of driving stations, an actual driving station D, and simulated stations $S_1$ $S_2$ . . . $S_8$. At the driver's station D are the conventional control, including stering wheel 18, gear shift 25, directional signals 27, clutch 19, brake 21, handbrake 23, horn 13 and accelerator 29. A control panel 15', including switch assembly 992' the purpose of which will be described hereinafter, is also a component of the driver's station.

Just above driver station D there is located a mirror 17 which provides a view of the station D for the students occupying the simulated stations $S_1$, $S_2$ . . . $S_8$. This arrangement permits the students to observe the driver's manipulation of the vehicle controls. Adjacent to station D there is also provided a projection screen 16 which is capable of being extended down into the operating position shown in the figure from a stored position on a suitable roll depending from the top of the vehicle.

For projecting a filmed sequence on screen 16, there is provided in the rear of vehicle 11, a motion-picture projector 10 mounted on a projection control booth 14. The booth includes a control panel 15 and certain control switches 992. The projector and screen are arranged such that the students may observe film presentations of an instructive character or simulations of various driving conditions. A slide projector may also be employed and general training materials, e.g., graphs, traffic diagrams, traffic rules and the like, may be displayed on the screen.

At each simulated stations, $S_1$, $S_2$ . . . $S_8$, there are provided simulated controls. These include a steering wheel 70, horn 71, clutch 80, brake 90, directional signals 130, gear shift 140, handbrake 170, and accelerator 900. The controls are arranged in a conventional manner to simulate the actual control configuration of an automobile. Each student is accordingly able to manipulate the controls in accordance with the actual traffic conditions he observes from his station, or in accordance with instructions or simulated traffic conditions projected on screen 16 from projector 10. To add to the realism, each student, by virtue of windshield 31 and side windows 33, is provided with both a lateral and longitudinal view of the course traversed by the vehicle 11. To establish this condition the students' stations $S_1$, $S_2$ . . . $S_8$ are arranged in two columns, each column being located adjacent corresponding side windows. Moreover, the stations are progressively elevated as they occur towards the rear of the bus. This arrangement thus affords each student an unobstructed view of the presentation depicted on screen 16 or through windshield 31 and the respective side windows 33.

The system described thus far provides, of itself, unusually effective means for training vehicle operators in that a group of students can practice control manipulations as directed from four different selective sources or stimuli. By virtue of mirror 17 the students can observe and mimic the driver's actions at station D (and correlate them with either the observed road conditions or with the simulated traffic events displayed on screen 16). They may also practice control manipulations without reference to the driver by simply following the observed traffic conditions as the bus travels the highway. They can also exercise the control functions as dictated by simulated conditions observed on screen 16 while the bus is stationary or moving. Finally, they may practice control exercises in response to oral commands originating with the driver, another instructor or a phonographic record, fed into a PA system (not shown). While all of these training procedures may be practiced, the most realistic one involves the exposure of the students to the real traffic incidents encountered by the vehicle as it progresses along predetermined or selected routes and their concomitant operation of the simulated controls. This procedure would usually represent the terminal part of the training program since preliminary instruction would be required to develop basic skills and understanding of the function of each control and control combination. These earlier stages can be effectively implemented by oral instruction and by making use of the film system and/or by directing the students to observe the driver's actions.

OBJECTIVE EVALUATION: DATA FLOW

Although the embodiment illustrated in FIGS. 1 and 2 provides means for enabling the student to practice control operation under real and simulated conditions, these structures do not permit objective evaluation of the student's performance. An instructor stationed in the bus may visually monitor the students' actions but such evaluation inherently would be limited by the subjective character of his appraisal and by his practical inability actually to see simultaneously the manual and pedal actions of each student. Nor could the instructor even by inspection, quantitatively judge control manipulations so as to determine whether braking occurs at the proper rates, whether the simulated vehicle has stalled, and whether other pertinent conditions exist.

For complementing the basic arrangement described above, the present invention provides a system for objectively evaluating each student's responses. The driver's control manipulations are similarly measured. Thus, as illustrated in FIGURE 3, there is associated with each student's station $S_1$, $S_2$ ... $S_8$, and with the driver's station, D, a sensing and evaluation circuit, $C_1$, $C_2$ ... $C_8$, and $C_D$ respectively. Each circuit is coupled to the controls of its associated station and is responsive to the manipulation of these controls. Also included in each circuit are means for determining whether or not certain control manipulations are correct. For facilitating the evaluation and recording technique there is coupled to each circuit, signals identifying the nature of traffic situations. In the mode of operation in which the students are observing actual traffic conditions, these signals which identify the nature of the impending condition are designated "Real Conditioning Signals" and are coupled to each circuit from a master control unit 180, which is energized in turn from a Real Situation control panel on assembly 15' operated by the driver. When the impeding traffic event is a simulated one displayed on screen 16, signals indicative of the nature of this imminent condition, designated "Film Conditioning Signals," are coupled to the circuits via the master control unit 180 from the projector system. The controls at each station are accordingly conditioned or activated according to the character of the real or simulated traffic situation.

Either the "Film Conditioning Signals" or the "Real Conditioning Signals" are selected in accordance with the desired mode of operation and are coupled to the sensing and evaluation circuits. These circuits receive two basic inputs: control manipulations and conditioning signals. The mechanisms included in the sensing and evaluation circuits respond to these inputs and develop reaction signals which indicate the manner in which each student has manipulated his controls. These reaction signals are coupled, as indicated in FIG. 3, to the recording system where each student's performance is recorded. To identify the nature of the traffic's situations which has been presented to the student, the selected conditioning signals are also coupled to the recording system for identification purposes. This identification is conveniently made in terms of the control actions which characterize the particular traffic situation.

As an illustration of the operation of the system, an example will be given in which it is assumed that vehicle 11 is approaching a traffic intersection where a full stop is required. This being the Real Situation mode of operation, the driver actuates a control switch on panel 15' which is associated with this full stop condition. The signals resulting from this control switch operation represent Real Conditioning Signals and are coupled to the master control unit. In response thereto, the master control unit transmits or couples selected conditioning signals to each of the sensing and evaluation circuits associated with the students' and driver's stations. These conditioning signals, in effect, inform the station circuits that a full-stop condition is impending. In response, sensing and evaluation circuits normally associated with full-stop controls, viz., the accelerator, clutch, brake and gear shift, are conditioned. If these controls are energized in the proper sequence and degree, the resultant reaction signals so indicate this performance and it is recorded on the recorder. If one or more of the controls have been improperly actuated there is a suppression of the reaction signals; an absence of a record on the recording chart indicates this error. In order that the chart may positively identify just what controls are involved, it is supplied with the conditioning signal which identifies the traffic incident as being one involving a full-stop. This identification is marked on the chart in terms of the relevant control actions so that the reaction signal records may be properly identified. Some typical recordings are illustrated in FIG. 8. In the left-hand column of the chart illustrated therein there is provided a series of tests with corresponding control functions identified. These test identifiers are stamped on the chart as just described. The circular marks associated with the driver and students, and correlated with the control manipulations in each test, represent proper reaction by the students and driver. An absence of the circles indicates an improper reaction to the traffic situation.[1]

Additional details of the above described system are illustrated in FIG. 4. The overall organization of the system is as described above; thus there is a plurality of students' stations, e.g. $S_2$ and $S_7$, and a driver's station, D. During the Real Situation mode of operation a control panel 992' is operated by the driver. The switches on this panel are actuated in accordance with the nature of the approaching traffic situation. The reaction circuits or sensing-evaluating means $C_1$, $C_2$ ... $C_8$, $C_D$, associated with each of the stations, are thus energized and consequently conditioned as determined by the nature of the impending traffic incident. Circuits for accomplishing this may be traced from control panel 992' through master control unit 180 to each of the students' stations $C_1$, $C_2$, etc., and the driver's station, D.

There is also provided a projector system for projecting the sequence of simulated traffic conditions on screen 16 visible to the students. When a simulated presentation is being relied on, the conditioning signals may be traced from the circuits shown in the upper left on FIG. 4 through a stepping switch 50, a programming unit 990, and thence to the master control unit 180 where the conditioning signals are distributed to the stations in the vehicle. The conditioning signals thus may originate either through the projector system or from the driver-operated Real Situation control panel 992'. For convenience another control panel 992 is provided at the projector booth 14 (FIG. 1) and is connected in parallel with driver panel 992'.

In addition to being distributed to the various stations, the conditioning signals also actuate a slave printing unit 800 of an identifier assembly 817. This assembly also includes a printing actuator 816, and printing disk 814 actuated thereby as described in more detail hereinafter. The disk 814 includes a plurality of identifiers 818 (see FIG. 8) which characterize the various traffic incidents which may occur either on the film or in actuality in terms of the relevant control functions. One particular set of identifiers on disk 814 is rotated into operative position relative to chart 66 in accordance with the particular control switch actuated on panel 992 or 992', or in accordance with the particular situation in the film sequence being presented by the projection system. For a particular traffic incident, then, an identification of this incident is provided on chart 66 and in addition the vehicular controls which are normally associated with this incident are rendered effective at the various stations by means of the conditioning signals flowing thereto. (Conditioning of the driver's controls signifies conditioning thereof for purposes of recording and not for actual vehicle control as these controls are always conditioned in the sense of being capable of controlling the vehicle.) In reaction to the impending traffic situation the driver and the students manipulate certain controls. The operation of these controls produces reaction signals, FIGS. 3, 4, at each station, indicating whether a control has been properly manipulated. These reaction signals are coupled to record markers 601, 611 ..., 602, 612 ..., etc., which respond by impressing on chart 66 indications in accordance with whether or not a control has been properly manipulated. For each station including the driver station and students stations, there are a plurality of record markers, illustratively four. In one particular traffic situation the four record markers might serve to determine: (1) whether or not the driver and students operated their brakes; (2) whether or not they neutralized their gear shifts; (3) whether or not they released their clutches; and (4) whether or not they subsequently held the brake depressed. The fact that each of the record markers so represents a particular control function is ---
[1] In some cases, the presence of a record mark indicates improper reaction, e.g. "did stall."

determined from the identifier impression made by the printing disk 814 which associates with each record marker a particular control function as indicated before in reference to FIG. 8.

At the conclusion of the above identified traffic situation, certain signals are generated either from the film or by manipulation of control switches on panel 992 (or 992′) which serve to perform several functions including the stamping of the test identifiers on the record and the advance of the record to a new position. After this de-conditioning period and upon the arrival of a new situation, the master control unit is again energized by either the driver or from the film projection system. When this occurs, new conditioning signals are generated in accordance with the nature of the new traffic situation, a different combination of controls are rendered effective as determined by this new situation, and the test identifying system is also actuated to provide a new set of identifiers identifying the control functions associated with the new situation.

SYSTEM COMPONENTS AND INTER-COMPONENT DATA FLOW

The details of certain components of the system of FIG. 4 are thoroughly described in the aforesaid copending patent application; they will be reviewed here generally for the sake of self sufficiency. As illustrated in the figure, the projection system includes a film 20 (and associated film driving mechanism, not shown), which is driven by projector motor 30. To energize the motor, projector start switch 34 is energized, completing a circuit to holding relay 32. One pair of contacts of relay 32 energize projector motor 30 from the alternating current source. The other contacts of relay 32 complete a holding circuit to the relay field via switch 26 such that the relay remains energized after the film start switch 34 is released and provided that switch 26 is closed. The latter is closed except when it engages notch 24 in the edge of film 20. This notch is cut into the film at the end thereof so that the film drive system, and specifically projector motor 30, is deenergized when the end of the film presentation occurs. As is evident in the figure, engagement of switch 26 with notch 24 opens the former and disables the projector motor circuit by way of de-energization of relay 32. While the film driving system is operated, an optical system (not shown) projects the film scene on screeen 16 which depends from the overhead of the mobile station 11.

As was noted hereinbefore, the sensing evaluating circuits, $C_1$, $C_2$ ... $C_8$, D, at each of the stations $S_1$, $S_2$ ... $S_8$, D, are conditioned to make certain of the students and driver's controls effective for measurement as determined by the nature of the particular traffic event confronting the students and driver.

Accordingly, the projector system must supply signals which notify the required circuits of the pending simulated traffic condition. This is accomplished by elements of the projector system which include a lamp 36, a photocell 38, an amplifier 40, and a relay 42. As a particular situation appears in the projection system, a corresponding mark 22 generates a pulse in the above described network of elements causing the actuation of relay 42. The contacts thereof accordingly close and a stepping motor 48 is thereby energized via lead 44. Energization of the stepping motor causes the movable contact of switch 50 coupled thereto to advance one step to the next position, e.g., $h$. When this is accomplished, power is fed via switch 50 to contact $h$, to the corresponding contact of programming unit 990, and thence to the master control unit. The latter cycles to a new position where particular circuits at the students' and driver's stations are conditioned.

The above typical circuit may be traced as follows: Supply 46 to the rotary arm of switch 50, to fixed contact $h$ of switch 50, to the corresponding lead in cable 980, to contact P990–$h$ of the plug P990 in the programming unit, to the mating contact J990–$h'$, to the corresponding lead in network 981, to the contact J990–8′, to the mating contact P990–8, to the corresponding lead in cable 982 and to terminal 991–8 in the master control unit. With energization of terminal 991–8, a rotary switching device is energized in the control unit and driven to a position corresponding with this terminal as described more fully hereinafter.

In the mode of operation where real conditions are presented an analogous data generation occurs. Thus as a particular traffic situation approaches, the driver actuates the appropriate switch in the group of switches 992′–1, 992′–2, ... 992′–9 on panel 992′ whereby a corresponding terminal of plug 991 in the master control unit 180 is energized. Assuming, for example, that the driver actuates switch 992′–8, then power supplied from source 46 is routed via the upper contact pair of switch 992′–8, through the corresponding lead in cable 983 to the contact 991–8 of plug 991 in the master control unit. Conditioning follows as described generally aforesaid and particularly hereinafter.

As is evident in the figures and exemplified in FIG. 4 there are output cables issuing from the master control unit 180, and connecting respectively to the sensing-evaluating circuits $C_1$, $C_2$, ... $C_8$, $C_D$. Thus cable D10 connects to circuit $C_D$ at the driver's station. Similar cables S10, S20, ... , S80 connect to $C_1$, $C_2$, ... , $C_8$ at the student's stations. For each terminal energized at plug 991 at the input to the master control unit there is a corresponding lead in each cable D10, S10, S20, ... , S80, energized. Thus energization of input terminal 991–8 produces energization of lead D10–8 in the driver's system, lead S20–8 to student station $S_2$, lead S70–8 to student station $S_7$ and comparable leads to the other stations. In addition the analogous lead in cable S90 to the test identifier printing unit 800 is energized. In dependence on which input lead at each station is energized, there is a particular combination of controls (dependent ultimately on the nature of the impending traffic condition) rendered effective in the sensing-evaluating circuits $C_1$, $C_2$, ... , $C_8$, $C_D$. In effect, a group of control functions, illustratively four, are allocated to the output cables at each of the stations in accordance with which input lead is energized. Thus four control functions associated with the driver's station D are selected and allocated to output cable D0. These four functions are similarly selected and allocated to the output cables at each of the student stations, e.g., to cables S02 and S07 at stations $S_2$ and $S_7$. The leads in each of these cables are connected to respective record markers in the recording unit to record the existence or non-existence of each control function. Thus each of the four functions originating at the driver's station D are allocated to a respective marker 601, 611, 621 and 631 in the recording unit. A similar arrangement characterizes the recording circuit of the other stations. Concurrently with the selection and connection of particular control functions to provide conditioning as aforesaid, the printing unit 800 in identifier unit 817 is driven to a position dependent on which lead in cable S90 is energized. Disk 814 is accordingly rotated to a discrete position to place the indentifiers for the selected control functions in operative position relative to record medium 66.

With conditioning and test identification completed, the selected controls in each station are sensitized and proper manipulation thereof produces signals which are transmitted via the respective leads in each cable D0 ... S02 ... S07 etc. to energize the respective record markers. Either all, some or none of the leads in each cable are energized depending on whether all, some, or none of the control functions are properly developed at each station.

At the conclusion of the testing interval during a particular traffic condition, de-conditioning occurs. The termination of this interval is initiated, either by the occurence of a terminal mark 22 on film 20 or by the driver's operation of a restore actuator 950 which is coupled to a detent mechanism X. Actuation of the member 950 releases the previously depressed switch on panel 992'. As the latter returns to its deactivated position, the pair of lower contacts thereof are bridged thus completing a circuit from supply 46 via these contacts to the contact R on a mode selector switch 54. With the rotary arm 54" of switch 54 in the R position, the above circuit is further coupled to paper feed 56, to a relay 993 and to print actuator 816. The latter responds by moving disk 814 into engagement with record medium 66 leaving an impression of the selected test identifiers thereon. By virtue of delays in paper feed 56 the latter does not drive medium 66 to a new position until after disk 814 has made an impression. There is also a delay, by virtue of capacitor 994, after which relay 993 is energized whereby the contacts thereof are opened. These contacts remain open, thus opening the return circuit of all record markers 601, 611, 621 and 631; 602, 612, etc. until a predetermined interval, effected according to the size of capacitor 994, after a new conditioning cycle has started. The start of such a cycle removes energization from the relay and after the delay interval the relay becomes de-energized whereby the contacts thereof close thus re-establishing the ground circuits of each of the record markers. With the record markers open-circuited during this latter delay interval, spurious transient signals associated with the start of the conditioning cycle are prevented from causing spurious actuation of the record markers.

Alternatively to deconditioning by actuation of member 950, is deconditioning during simulated presentations, accomplished by a terminal mark 22 on film 20. This mark generates a pulse as described hereinbefore thus causing stepping switch 50 to advance to one of the alternate contacts 51a which are sequenced between the contacts a, b, c, . . ., j, of switch 50. The resultant engagement of any contact 51a couples power from source 46 to terminal F of mode selector 54 and if the movable contact 54" thereof is in this position, the disk 814, the paper feed 56 and the relay 993 are energized as aforesaid. Thus deconditioning occurs in both the real and simulated modes of operation.

It may be seen from the foregoing that conditioning of selected controls at each station as well as test identification is initiated as a simulated or real situation approaches, that development of proper control functions by the students and driver—among those functions selected by conditioning—results in appropriate actuation of the respective record markers and that deconditioning then follows which provides a marking of the record medium with the test identifiers and the subsequent advance of the record medium to a new position.

Master Control Unit and Slave Units

Internal details of the master control unit are comprehensively described in applicant's aforementioned copending application. By way of review thereof reference may be had to FIG. 7. As illustrated therein the master control unit receives inputs either from the projector system via cable 980, programming unit 990 and cable 982 which is wired to plug 991 or from the generation of real conditioning signals via cable 983, also wired to plug 991 in parallel with cable 982. From the terminals of plug 991 individual connections are made to respective fixed contacts of a wafer switch 185, the movable contact 186 of which is mounted on a shaft 184. A stepping solenoid 182 is also connected to shaft 184 and is electrically connected to the movable contact 186 which is in the form of a notched ring. When in the course of a conditioning cycle a particular terminal of plug 991 is energized from source 46 as described hereinbefore, the corresponding fixed contact on wafer switch 185 is energized. Movable ring contact 186 in contact therewith accordingly receives source voltage and couples the same to solenoid 182, the circuit to which is thus completed via the ground return. In response, the solenoid commences a pulsating rotary movement which rotates shaft 184 and rotary ring contact 186. When the notch in the latter becomes aligned with the energized fixed contact, the circuit is opened and the solenoid becomes deenergized. Thus shaft 184 adopts a discrete one of a plurality of positions in dependence on which particular terminal of plug 991 is energized.

Connected to shaft 184 are a group of further wafer switches each having a plurality of fixed contacts on respective stators 189a, 189b, 189c, 189d, . . ., and a co-operating rotary contact 188a, 188b, 188c, 188d . . . . For a system of nine stations, nine such switches will be provided as there is one switch provided for each station. For simplicity only five are shown. The rotor of each switch is mounted on shaft 184, is energized from source 46, and transfers power from the same to a selected fixed contact on the corresponding stator depending on the position of shaft 184. The fixed contacts on each stator are each connected to respective leads which form an associated output cable, D10, S10, S20 . . . S80 for each switch (see corresponding cables in FIGS. 3 and 4). Each cable is routed to a respective station $S_1$, $S_2$, $S_3$, . . . $S_8$ or $C_D$ and particularly to a slave printing unit 100, 200, . . . 700 . . . therein. The number of leads in each output cable (and the number of corresponding operative contacts on each of the switches 189a, 189b, 189c, 189d . . . in the master control unit) depends on the number of traffic conditions to be presented. Illustratively nine conditions are provided for #1, #2, #3 . . . #9, and accordingly each cable D10, S10, S20 . . . S80, is provided with nine leads. In FIG. 7 only four are shown. The terminal end of each lead of the respective cable is connected to an associated fixed contact on a wafer switch 266 of the slave printing unit housing the same. Each switch 266 is equipped with a rotary contact 67 driven by a shaft 65 which is driven in turn by a stepping solenoid 268. These elements cooperate in a manner analogous to the corresponding elements in the master control unit. Thus the shaft 65 in each slave unit 100, 200, etc., takes up a position depending on which lead in the associated cable D10, S10, S20, . . . S80, is energized. It may be seen then that the slave units act as repeaters or follow-up devices which remotely repeat the position of the master control unit shaft. This arrangement also characterizes the positioning of the printing unit 817 in response to the master control unit via cable S90.

On the shaft of each slave unit are a group of switches 64 the rotors 67' of which are positioned by the shaft. The number of switches correspond with the maximum number of control functions associated with an operating condition, illustratively four. This number also corresponds with the number of record markers 607, 617, 627, etc., associated with each station. The number of operative fixed contacts on each switch 64 corresponds as suggested hereinbefore with the total number of operating conditions.

The rotor of each switch 64 is assigned to and makes connection with one of the record markers allocated to the respective station via the respective output cable D0, S01, S02, . . . S08 (see also FIGS. 3 and 4), there being illustratively four leads in each cable and four record markers, one connected to each lead. In accordance with the position of the shaft 65 in each slave unit, the four rotors 67' thereon (and thus the record markers) connect respectively to four contacts, one on each switch 64. These four contacts respectively connect in turn to four leads which are routed to certain of the sensing circuits of the corresponding student or driver station and particularly to the sensing circuits allocated to a particular operating condition. Thus four leads at each slave unit are allocated to each operating condition. As the position of the slave shaft 65 changes in response to a new conditioning cycle, four new leads assigned to this new condition are connected via the switches 64 to the respective record markers. The effect of this switching action in terms of control manipulations will become clear when the sensing-evaluating circuits of each station are more fully-described hereinafter.

STUDENT SENSING-EVALUATING CIRCUIT

Considering now the details of a particular student's sensing-evaluating circuit, reference may be had to FIG. 5. The circuit disclosed therein is substantially identical to the corresponding circuit described in the aforesaid copending application. As noted hereinbefore, the sensing-evaluating circuit is responsive to control manipulations. There is thus associated with each circuit a steering wheel 70, horn 71, clutch 80, brake 90, starter button 110, directional signal control 130, gear shift 140, handbrake 170 and accelerator 900. There are various circuits associated with each of these controls, these circuits being designed to produce signals related to manipulations of the controls. The signals thus developed are then combined into various groups, each group characterizing control actions associated with a particular operating condition. This combining of signals is reflected in the groupings of terminals on the left-hand side of the figure. The connections associated with group $a$, when traced out, indicated that this group is related to the starting procedure of the automobile including the shifting of gears into the low speed range. This operation, for reference, has been designated condition #1. The circuit associated with the terminals $b$ will be found to embrace control operations involved in shifting of the automobile transmission into second speed range (condition #2). Similarly, group $c$ relates to shifting the automobile into "high" (condition #3); group $d$ relates to shifting into reverse (condition #4); group $e$ releates to stopping the automobile (condition #5); group $f$ relates to operation of the directional signals (condition #6); group $g$ concerns operation of the handbrake (condition #7); group $h$ relates to certain braking and steering operations (condition #8) and group $j$ relates to certain speed control and signaling procedures (condition #9). The ultimate connection of these networks to the recording system may be clearly seen by reference to FIG. 7 where each network associated with a condition is connected to the slave switching unit of the respective station where the appropriate network is selected and connected to the record marker (see also FIGS. 3, 4).

For converting control manipulations into related electrical signals, appropriate transducers are provided in association with each of the vehicle controls. Accordingly, there is coupled to steering wheel 70 a switch, the rotary arm 73 of which is energized from the DC source 46 and which connects this source to one of the fixed contacts 74, 75 or 76 in accordance with the position of the steering wheel 70. A voltage on contact 74 indicates that the steering wheel is centered; this voltage is coupled to output terminal 62$h$; a voltage on contact 75 or 76 indicates that the steering wheel has been displaced to the right or left, respectively. The signal voltages produced by these displacements are converted into pulse type signals by means of delay relays 78 and 79. Thus, if the steering wheel is turned to the right, the voltage delivered to contact 75 is applied to relay 78 and via the contacts 78' thereof is also coupled to output terminal 63$h$. However, after the time delay interval of relay 78 has elapsed, the relay is energized, thereby disconnecting the signal voltage from the output terminal. A similar action occurs if the steering wheel is displaced to the left, a voltage pulse occurs at terminal 61$h$ via relay 79.

This impulse type action is provided so that premature operation of a control by a student (prior to the testing interval) will not result in a correct indication on the recording chart 66. If the student has displaced the steering wheel before it is time to do so, the resultant signal will terminate shortly after this control action by the aforementioned relay action and will not appear during the test period when the steering wheel should have been displaced.

A similar technique characterizes the circuits associated with the other controls. To horn 71 there is coupled a switch 71' which when actuated couples a pulse from source 46 to output terminal 60$j$ via the contacts 72' of impulse relay 72, the signal ceasing after relay 72 is energized.

Coupled to the directional signal lever 130 is a switch 130' which transfers a voltage from source 46 to fixed contacts 131 or 132 if the signal lever is placed in the "left turn" or "right turn" position. The voltage thus developed is converted into an impulse via impulse relay 133 or 134 and the resultant "left turn" or "right turn" impulse appears at contact 60$f$ or 61$f$, respectively.

For indicating operation of handbrake 170, a switch 171 is provided which is actuated thereby and which energizes output terminal 60$g$ from the voltage supply 46 when handbrake 170 is fully set. Impulse-type operation is not provided in this circuit. In the case of the shift lever 140 there is coupled thereto a switch 141 which applies voltage from source 46 to selected pairs of fixed contacts N, N', L, L', S, S', H, H' or R, R' in accordance with the position of the shift lever. The voltage coupled to the appropriate fixed contact appears at an output terminal connected thereto. There is accordingly connected to fixed contacts N, L, S, H and R, output terminals 61$e$, 61$a$, 61$b$, 61$c$ and 61$d$, respectively.

For indicating a release of clutch pedal 80 (clutch engaged), there is coupled thereto a normally closed switch 82 which by its connection to source 46 and to output terminals 62$a$, 62$b$ ... 62$e$ provides signals at these points whenever the clutch pedal 80 is released. Signals indicating operation of brake 90 are developed in accordance with the actuation of a switch 90', which is mechanically connected to the brake. Medium and full braking actions produce voltages at contacts 92 and 91, respectively, and at the output terminals 62$j$ and 63$j$, respectively connected thereto. A light braking effort results in a voltage at fixed contact 93 and this voltage is converted to a pulse-type signal through the action of impulse relay 94 and its associated contacts 93'. The resultant impulse appears at terminal 61$j$.

Operation of accelerometer 900 causes actuation of a movable switch contact 902 coupled thereto, with a resultant voltage being switched to the fixed contacts 903, 904 or 905 thereof in accordance with the degree of depression of the accelerator. Consequently, a voltage appears at output terminals 63$d$ and 63$e$, connected to contact 903, or output terminals 63$a$ and 63$b$, connected to contact 904, or output terminal 63$c$, connected to contact 905, in accordance with the degree of depression of the accelerator.

In the training procedure it is desirable that evaluation of dynamic control manipulations be supplied and frequently it is also desirable to evaluate the students' coordination of controls as they affect particular conditions of the vehicle. Thus, where there is a possibility of skidding, it is desirable to train the student in "feathering" the brake. To this end an RC circuit 97, 92' is provided. This circuit is connected to a relay 98 and is responsive to manipulations of brake 90. The RC circuit is energized whenever brake deflections are such as to produce a voltage at contact 92 of the brake switch 90'. When the brake is properly feathered, relay 98 is energized from the RC network and the contacts 99 thereof complete a circuit from source 46 to output terminal 60$h$. Thus, successive pumping produces a train of pulses at brake contact 92, these being integrated by the RC network to produce an energizing voltage for relay 98 whereby a signal appears at the output terminal.

Another vehicle condition related to the manipulation of the controls involves the stalling of the engine; the circuit of FIG. 5 provides means for computing stall conditions and indicating the condition of a stall at selected output terminals. There is thus provided stall sensing means including a relay 166 which is initially energized by depressing momentary ignition switch 110 provided that either:

(1) The gear shift is in the N (neutral) position (switch 141 at N'), or (2) The clutch pedal 80 is depressed (switch contacts 83, 84 closed), or (3) The gear shift 140 is in the "low" or "second" speed position (switch 141 at L' or S') and vehicle speed is within a certain range (vehicle speed centrifugal switch 162 contacting ls), or (4) The gear shift 140 is in the "high" position (switch 141 at H') and vehicle speed is within a certain range (vehicle speed centrifugal switch 162 contacting h) or (5) The gear shift 140 is in the reverse position (switch 141 at R') and vehicle speed is within a certain range (vehicle speed centrifugal switch 161 contacting r).

These five conditions simulate the actual conditions under which ignition can properly occur by depressing the starter button 110. The simulation of these conditions is reflected in the five-branch parallel circuit I, II . . . V which is serially connected to starter switch 110. If the circuit in any one branch is closed by establishing one of the above five conditions, then actuation of starter switch 110 will complete a circuit to stall relay 166. The relay is maintained in the energized state after switch 110 is released, by a holding circuit comprising the series connection of relay contacts 165 and a clutch-responsive switch 86. It may be seen from FIG. 5 that this holding circuit shunts starter switch 110 and as long as this holding circuit or the five-branch circuit I, II . . . V, is not interrupted, then relay 166 remains energized in simulation of engine operation.

With relay 166 energized, the contacts 167 thereof open thus removing a voltage, otherwise obtained from source 46, from output terminals 60a, 60b, 60c, 60d and 60e. Thus, the presence or absence of voltage on these terminals indicates stall or non-stall conditions respectively.

A departure from any one of the five conditions noted hereinbefore produces a simulated stall whereby relay 166 is deenergized. A stall can also be produced by an action which opens clutch-responsive switch 86.

In the following description it will be assumed that switch 86 remains closed. Accordingly, attention may be directed to the five-branch circuit and the effect it has in a typical operating maneuver. It may be seen from this circuit that any transient movement of shift lever 140, for example from "neutral" to "low" or from "low" to "second" will open the circuit to relay 166 unless clutch-responsive switch 83 is closed. Since this switch is only closed when the clutch pedal 80 is depressed (clutch disengaged), then it may be seen that any gear shifting unaccompanied by clutch disengagement will produce a stall. In addition, an inspection of the five-branch circuit indicates that a shifting to either "low,'" "second," "high" or "reverse" must be effected during an interval when the vehicle is operating in the proper speed ranges. Otherwise, upon release of the clutch pedal 80 with the resultant opening of switch 83, no one of the other parallel branches will provide a complete circuit to maintain relay 166 energized. Thus, if the shift is in position L', S' or H', and the centrifugal switch 162 is not in its proper position (i.e., vehicle speed is improper) then no one branch in the stall circuit will be completed and relay 166 will accordingly deenergize, thus indicating a stall. (When the relay is deenergized, its contacts 167 are closed, thus connecting power from source 46 to output terminals 60a, 60b, 60c, 60d and 60e.) Thus, not only must the clutch pedal be depressed during shifting but, in addition, the shifting must be coordinated with vehicle speed; otherwise a stall results.

Consideration may now be given to switch 86. As indicated in FIG. 6, this switch is actuated from an arrangement 150 which is actuated in turn by clutch pedal 80. Arangement 150 comprises rate responsive means responsive to the rate of release of clutch pedal 80. If this rate is improper, then switch 86 connected thereto is opened, thereby breaking the holding circuit to relay 166. A simulated stall thus occurs. An example of a unilateral rate responsive system suitable for use in the arrangement 150 is described in applicant's aforementioned copending application, or in application S.N. 684,538 of the applicant on Driver Training Apparatus, filed Sept. 17, 1957.

In view of the foregoing, it may be seen that the effects of control coordination or an absence thereof are simulated in the circuit of FIG. 5 including the effects of clutch and shift coordination, the effects of dynamic clutch action and the effects of gear shifting under various vehicle speed conditions.

Vehicle speed computation and simulation will now be considered. As is evident in FIG. 5, energization of relay 166 causes contacts 111 to close, thus applying power from the alternating current source to a motor 88 via a rheostat 901. The arm of rheostat 901 is coupled to accelerator pedal 900, thus providing control over the speed of motor 88 in accordance with accelerator position. The output shaft 88' of motor 88 has fixed thereon a gear 121b which engages in turn a gear 121a on a shaft 122. The velocity of shaft 122 represents the analog of vehicle speed while the velocity of shaft 88' of the motor represents the analog of engine speed.

To simulate the effects of clutch operation on vehicle speed, motor 88 is coupled to the armature of a solenoid 87. The latter is energized from the source 46 via a switch 85 operated by clutch pedal 80. Depression of clutch pedal 80 closes normally open switch 85 thereby completing the circuit to solenoid 87; the latter in response, displaces motor 88 and gear 121b connected thereto out of engagement with shaft 122 and gear 121a carried thereon. The drive to shaft 122 is accordingly removed in simulation of the effects of disengaging the vehicle engine from the drive shaft. Unless drive is again restored to shaft 122, the latter will gradually coast to a stop and the simulated speed observed on the meter-tachometer 120 will decrease to zero. The effects of a stall are also simulated in that energization of stall relay 166 opens contacts 111 thereof, thus removing power from motor 88. Braking functions are similarly simulated. Operation of brake pedal 90 applies a voltage from source 46 to contact 93 of the brake switch and, accordingly, to a solenoid 89 connected thereto. Activation of solenoid 89 moves a braking member 95 coupled to the solenoid armature into engagement with a drum 96 fast on shaft 122. The resultant friction acts to reduce the simulated vehicle speed represented by the velocity of shaft 122 in analogous fashion to applying braking effort in an actual vehicle.

It may be seen from the foregoing that the simulated speed of the engine is responsive to the accelerator and brake, to the clutch, and to the stall simulated circuit which is responsive in turn to clutch, gear shift, accelerator and brake operations. An alternate speed simulation arrangement, disclosed in applicant's aforementioned copending application S.N. 684,538, may also be employed.

DRIVER SENSING-EVALUATING CIRCUIT

The controls at the driver's station are the actual vehicle controls as distinguished from the simulated controls installed at the students' stations. There are accordingly certain unique problems associated with the driver's station which have been solved by arrangements of vehicular and electromechanical components, described below. On the other hand, certain simplifications are possible at the driver's station. There is no need, for example, to compute and simulate vehicle speed nor steering wheel reaction forces.

The driver's station illustrated in FIG. 6 is similar in some respects to the students' stations. The similarities reside principally in the association with the driver controls of certain electrical sensing circuits. Thus, there is coupled to the driver's steering wheel 18 a switch 145, the rotary arm 145' of which is positioned by movement of the steering wheel. With the steering wheel centered, the rotary arm is connected to the center fixed contact, thus supplying a signal from source 46 to output terminal 62h. With the steering wheel deflected to the left or right, the corresponding fixed contact of switch 145 is energized from source 46 via the rotary arm of the switch, thereby providing a signal for recording purposes at output terminal 61h or 63h. As was the case at the students' stations, these signals are converted from steady values to pulse-type signals via associated delay relay 78 and 79.

Operation of horn 13 at the driver's station causes actuation of a switch 146 which is mechanically coupled to the horn button and which serves to momentarily transfer power from source 46 to output terminal 60j via the contacts 72' of impulse relay 72. Similar to the corresponding arrangement at each student's station is an electrical circuit associated with the driver's directional signal lever 27. Mechanically coupled to this lever is a switch 130', and when either of the operative fixed terminals thereof is energized by deflecting the lever, there is developed at output terminals 60f or 61f an impulse-type signal developed by impulse relay 133 or 134. Thus, when the directional signal control is moved to the "right turn" position, impulse relay 134 is energized from supply 46 via switch 130' and a signal is thus momentarily supplied to output terminal 61f, the signal persisting until the relay armature closes. This impulse signal is then transmitted to the recorder to indicate that the driver has signaled a right turn.

For indicating operation of the driver's handbrake, a switch 171 is provided which has one contact energized from source 46 and positioned by the driver's handbrake 23. Operation of the handbrake closes the switch thereby supplying a signal to output terminal 60g.

The accelerator sensing circuit is also similar to the previously described student arrangement. There is mechanically coupled to the accelerator 29, the movable contact of a switch 902 which is energized from supply 46. One of the stationary contacts 903, 904 or 905 is energized from the supply via the rotary arm of the switch in accordance with the degree of depression of the accelerator. Energizing contact 903, 904 or 905 causes a signal to appear at terminal 63d and 63e connected with contact 903, or at terminals 63a and 63b connected with contact 904, or at output terminal 63c connected with contact 905.

Braking operations by the driver are sensed in the circuit of FIG. 6 by an arrangement of components which includes a switch 90' mechanically coupled to the brake 21 and energized from source 46. A light depression of the brake energizes fixed contact 93. The resultant signal is converted by means of impulse relay 94 and its associated contacts 93' to a pulse which is coupled to output terminal 61j. A further depression of brake 21 energizes fixed contact 92 of switch 90' thereby causing a signal to appear at output terminal 62j connected thereto. Also associated with fixed contact 92 is an integrating circuit similar to the one employed in each student's station. This integrating circuit functions to evaluate "feathering" actions of the brake and supplies a signal indicative thereof to output terminal 60h. Full braking effort energizes contact 91 of switch 90 thereby energizing output terminal 63j connected thereto.

When the driver depresses clutch pedal 19, a switch 172, coupled thereto, is opened; with the clutch pedal released, switch 172 (corresponding to switch 82 at the student station) is closed thus energizing output terminals 62a, 62b, 62c, 62d and 62e connected thereto whereby clutch pedal release (clutch engaged) is indicated.

For indicating the position of the driver's gear shift control 25, a switch 141 is mechanically coupled thereto and energized from source 46. The rotary arm of switch 141 is connected to fixed contacts, N, L, S, H or R, depending upon the position of the shift control, and a resultant signal appears at output terminal 61e, 61a, 61b, 61c or 61d, according to whether the control is in the "neutral," "low," "second," "high," or "reverse" position. To this extent the arrangement is similar to that employed at each student station.

While there was a need in connection with equipping each students station to provide a stall computing circuit, such a requirement is manifested in a different way as far as the driver's station is concerned, since there is no need to simulate a stall per se as the bus will actually stall if the controls are not properly manipulated. To detect this stall the vehicle's manifold pressure may be utilized as the time an absence of manifold pressure indicates that the vehicle has stalled. Under other conditions, however, e.g., ignition "off", an absence of manifold pressure is normal without a stall condition. Since these other conditions will normally occur outside the testing interval, their effects may be ignored for purposes of simplification.

The driver circuit for indicating stall is responsive to manifold pressure tapped from the vehicle's manifold system 115 via an appropriate coupling 115'. The coupling supplies manifold pressure to a pressure-sensitive switch 116. If manifold pressure is not developed by the vehicle engine, switch 116 is energized, supplying a "stall" signal for recording, to output terminals 60a, 60b, 60c, 60d and 60e, connected thereto, from source 46.

Referring back momentarily to FIG. 4, it may be recalled that the seal situation control switches 992 are operated by the driver. These may be operated manually either by the driver's depression thereof or by way of certain driver controls such as the brake 21, accelerator 29, clutch 29, direction signaller 27, handbrake 23, or shift 25. As schematically indicated in FIG. 6, these controls may be mechanically linked to particular switches 992' such that actuation of a control causes a corresponding actuation of the respective switch 992'-1, 992'-2, . . . or 992'-9 thereby conditioning the sensing circuits of the related students' controls. Once a switch 992' is actuated, no disturbance thereof will occur until the deconditioning control 950 (FIG. 4) is actuated.

As an example of the above function, the effect of the driver's actuation of signal lever 27 may be considered. Such an operation causes actuation of the respective switch 992'-6 whereby the network of terminal group #6 at each station (FIGS. 5, 6 and 7) is connected to the respective set of markers in the recording system. All students who timely follow the driver's action will receive a corresponding mark on chart 66. (The driver may have to actuate his control twice in order to produce a record of his control actions in those cases where the impulse relays are activated.) Examples similar to the above include actuation of switch 992'-7 by operation of the driver's handbrake 23 whereby the network connected to terminal group #7 is conditioned, and actuation of switch 992'-9 by operation of the driver's brake 21 whereby the networks connected to terminal group #9 are connected to the respective recorders at each station.

MODES OF OPERATION

Various modes of operation according to the invention are possible. Particular procedures will depend upon local conditions and upon which phase of the training program is being implemented.

Thus in the early stages of training the students may be acquainted with the various controls, can carry out static drills under verbal or graphic command and can track or follow-through the control movements demonstrated by the driver and witnessed by the students with the aid of mirror 17.

In the course of developing these basic proficiencies the driver by dynamic operation can actually demonstrate the real effects of various control movements, again with the aid of mirror 17 and by virtue of the students' ability to observe the actual traffic conditions and the reactions of the driver and vehicle thereto. During these phases, instruction and demonstrations can be presented by way of the film projection system. The development in the students of basic driving skills can be continuously monitored throughout all these steps by virtue of the recording system. Evalution can be effected either on an absolute basis in terms of performance of specific steps as listed, for example, in chart 66 of FIG. 8 or by a comparison with the norm or standard reflected in the records of the driver's responses.

As training advances the students can be exposed to both real and simulated dynamic conditions of a vigorous and challenging nature and their control responses sensed and indicated as by the recording system. By these techniques and mechanisms, safe and thorough driver training can be effectively and economically accomplished.

The invention in its broader aspects is not limited to the specific mechanisms shown and described but departures may be made therefrom within the scope of the accompanying claims without departing from the principles of the invention and without sacrificing its chief advantages.

What is claimed is:

1. Apparatus for training students in vehicular operation comprising:
   a vehicle,
   driver control means for driving said vehicle by performing manual control operations on said driver control means,
   at least a single simulated control means within said vehicle operable by a student to perform manual control operations corresponding to at least some of said control operations performed on said driver control means,
   first means for sensing at least a single one of said control operations performed on said driver control means,
   second means for sensing at least the control operation performed on said simulated control means corresponding to said single one of said control operations,
   first means connected to said sensing means for producing first signals when said first sensing means senses said single one of said operations has been performed,
   second means for producing second signals when said second sensing means senses said corresponding operation has been performed, and
   means for recording said first and second signals for comparison of the operations of the student with the operations of the driver.

2. Apparatus as in claim 1 wherein said vehicle is a bus, and including a plurality of simulated driver stations located in said bus so as to provide a view longitudinal and laterial of the path of said bus and a plurality of said simulated control means, one of said simulated control means being at each said station.

3. Apparatus as in claim 2 wherein said bus has a window provided adjacent each said station and each said station is raised above the level of the station in front of it.

4. Apparatus as in claim 3 wherein each said simulated control means includes a foot brake, a clutch, a gear shift and a steering wheel.

5. Apparatus as in claim 4 including mirror means mounted adjacent said driver control means for making the control operations performed on said driver control means visible to said students at said simulated control means.

6. Apparatus as in claim 1 wherein said first and second sensing means include a plurality of means each sensing a different control operation and including means manually operable by said driver for producing signals indicating which control operations should be performed by said student and said driver and means for receiving said indicating signals and for connecting only those sensing means, which sense a control operations indicated by said indicating signal producing means, to said first and second producing means.

7. Apparatus for training students in vehicular operation comprising:
   a vehicle,
   driver control means for driving said vehicle by performing manual control operations on said driver control means,
   at least a single simulated control means within said vehicle operable by a student to perform manual control operations corresponding to at least some of said control operations performed on said driver control means,
   means for sensing said manual control operations performed by said student,
   means, connected to said sensing means for producing signals containing information on said control operations,
   means, manually operable by said driver, for producing signals indicating which control operations should be performed by said student on said simulated control means,
   means connected to said indicating means for receiving said indicating signals and causing said information signals producing means to produce signals containing information only on those control operations indicated by said indicating means, and
   means for recording said signals containing information only on said control signals indicated by said indicating means.

8. Apparatus as in claim 7 including actuable means for preventing said recording means from recording signals, manually operable means for actuating said preventing means after said manual control operations have been completed and means for delaying the deactuation of said preventing means after said indicating means is manually operated.

9. Apparatus as in claim 7 including screen means mounted within said vehicle, and means for presenting visual images on said screen means depicting traffic conditions means for responding to information recorded with said images with signals indicating which control operations should be performed by said student on said simulated control means, means for disconnecting said receiving and causing means from said manually operable indicating means and connecting said receiving and causing means to said responding means.

10. Apparatus for training students in the operation of a vehicle comprising:
    means for driving said vehicle,
    a plurality of simulated control means within said vehicle mounted for operation by said students independently of said driving means so that each said student has a view of the exterior of the vehicle,
    means for sensing the responses of said students while said vehicle is being driven with said control means to conditions exterior to the vehicle viewed by said students, and
    means for recording said sensed responses.

11. A method of training students in the operation of a vehicle comprising the steps of:
    performing manual control operations on driver control means for driving said vehicle,
    performing manual control operations on at least a single simulated student control means,
    producing signals indicating which control operations should be performed on said student control means, sensing the control operations indicated by said signals and performed on said student control means, and recording said sensed control operations.

12. A method of training students in the operation of a vehicle comprising the steps of:
performing manual control operations on driver control means for driving said vehicle,
performing manual control operations on at least a single student simulated control means,
sensing at least some of said manual control operations performed on said driver control means,
sensing at least some of said manual control operations performed on said student control means,
producing first signals indicating the sensed operations performed on said driver control means,
producing second signals indicating the sensed operations performed on said student control means, and recording said first and second signals.

13. In the training of students in motor vehicle operation, a system for aiding said training by confronting said students with real and simulated operating conditions, and objectively evaluating and recording the resultant performance of said students and the resultant performance of the actual operator of said vehicle comprising a vehicle having an actual operator's station with associated controls and a plurality of simulated operator's stations each including simulated controls, a screen, said actual and simulated stations being located in said vehicle so as to provide a view longitudinal and lateral of the path of said vehicle and a view of said screen, a student's electrical sensing circuit associated with each of said simulated stations and responsive to the operation of the associated controls, a driver's electrical sensing circuit responsive to the operation of the actual controls, an electromechanical recording system including a set of marking elements associated with said driver's sensing circuits and with each of said student's sensing circuits and also including data identification means, a film projector system adapted to display scenes on said screen, a projector signalling circuit responsive to said projector system and actuated in accordance with changes in said simulated scenes and a manually actuated signalling circuit adapted to be actuated in accordance with actual conditions encountered in the vehicle's operations, and a control conditioning circuit selectively responsive to said manually actuated signalling circuit and to said projector signalling circuit and including means for connecting selected networks of each of said student's sensing circuits and selected networks of said driver's sensing circuit to the associated marking elements of said recorder and also including means for energizing said data identification means of said recorder in correspondence with the selection of said networks, the aforesaid components of said training system, cooperating as aforesaid whereby the performance of the driver and the students is recorded with respect to their manipulation of certain vehicle controls rendered effective for the recording in accordance with actual conditions encountered in vehicle operation or in accordance with simulated conditions presented by the film.

14. A system according to claim 13, in which said vehicle includes an optical system for presenting a view of the manipulation of said actual controls to said students.

References Cited

UNITED STATES PATENTS

| | | |
|---|---|---|
| 2,512,876 | 6/1950 | Rice. |
| 2,584,149 | 2/1952 | Moffitt et al. _____ 346—49 |
| 2,814,156 | 11/1957 | Cislak _____ 46—1 |
| 3,015,169 | 1/1962 | Chedister et al. _____ 35—11 |

OTHER REFERENCES

"School Bus," Popular Science Magazine, published September 1959 (page 103 relied upon).

EUGENE R. CAPOZIO, Primary Examiner

W. H. GRIEB, Assistant Examiner